(12) United States Patent
Taku et al.

(10) Patent No.: US 9,987,570 B2
(45) Date of Patent: Jun. 5, 2018

(54) FILTER ELEMENT AND FILTERING DEVICE

(71) Applicant: YAMASHIN-FILTER CORP., Kanagawa (JP)

(72) Inventors: Meiho Taku, Kanagawa (JP); Hideo Nakaoka, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 411 days.

(21) Appl. No.: 14/727,730

(22) Filed: Jun. 1, 2015

(65) Prior Publication Data

US 2015/0343338 A1 Dec. 3, 2015

(30) Foreign Application Priority Data

Jun. 3, 2014 (CN) ...................... 2014 2 0290509 U

(51) Int. Cl.
  *B01D 29/13* (2006.01)
  *B01D 29/11* (2006.01)
  *B01D 36/00* (2006.01)

(52) U.S. Cl.
  CPC ............ *B01D 29/13* (2013.01); *B01D 29/114* (2013.01); *B01D 36/00* (2013.01); *B01D 2201/291* (2013.01); *B01D 2201/342* (2013.01)

(58) Field of Classification Search
  CPC ...... B01D 29/13; B01D 29/114; B01D 36/00; B01D 2201/342; B01D 2201/291
  See application file for complete search history.

(56) References Cited

U.S. PATENT DOCUMENTS

| 3,897,967 A * | 8/1975 | Barenyi ................. B60R 13/04 |
| | | 114/219 |
| 6,511,108 B1 * | 1/2003 | Roessner, III ......... B65D 55/06 |
| | | 24/16 PB |
| 2010/0078379 A1 * | 4/2010 | Rocklitz ................ B01D 25/26 |
| | | 210/493.1 |
| 2011/0192126 A1 * | 8/2011 | Volkmann .......... B01D 46/0005 |
| | | 55/502 |
| 2011/0197556 A1 * | 8/2011 | Brown ................. B01D 46/527 |
| | | 55/498 |

FOREIGN PATENT DOCUMENTS

EP 676273 A2 * 10/1995
JP 2000-153112 A 6/2000

* cited by examiner

*Primary Examiner* — Krishnan S Menon
*Assistant Examiner* — Waqaas Ali
(74) *Attorney, Agent, or Firm* — Nakanishi IP Associates, LLC

(57) ABSTRACT

In a filter element, plates are provided in a manner of covering ends of an outer cylinder and an inner cylinder. A packing having a substantially hollow annular plate shape is provided on the plate. A filtering material is provided between the outer cylinder and the inner cylinder. The packing is abutted against a surface of the case in parallel with the plate and a cylindrical outflow portion having a surface parallel to the inner cylinder.

10 Claims, 3 Drawing Sheets

FILTER ELEMENT AND FILTERING DEVICE

BACKGROUND OF THE INVENTION

Field of the Invention

The present invention relates to a filter element and a filtering device.

Background of the Invention

Patent Document 1 discloses a sealing structure in a cartridge filter housing, in which a sealing portion of a container body and a cap is consisted by a first O-ring inserted into an annular groove recessed in an outer circumferential surface of a head of the cap and a second O-ring inserted into a compartment having a substantially triangular cross section, wherein the compartment is formed by a bevel portion formed on a lower end of the head of the cap, a horizontal step portion and a vertical wall formed inside the container body.

PRIOR ART DOCUMENT

Patent Document 1: Japanese Patent Publication No. 2000-153112

In Patent Document 1, since the two O-rings are compressed in different directions, respectively, the leaking proof effect is improved. However, to assure sufficient leak-proofing, the sealing structure disclosed in Patent Document 1 requires at least two packings.

SUMMARY OF THE INVENTION

One or more aspects of the present invention relate to a filter element and a filtering device, capable of achieving a sufficient leak-proof effect, e.g., even with a single packing.

In an aspect of the present invention, a filter element includes: a substantially hollow cylindrical shaped outer cylinder having openings at both ends thereof; a substantially hollow cylindrical shaped inner cylinder provided inside the outer cylinder and having openings at both ends thereof; a substantially hollow cylindrical shaped filtering material provided between the outer cylinder and the inner cylinder; a substantially cylindrical shaped plate having a bottom portion provided in a manner of covering an end of the outer cylinder and the inner cylinder with the filtering material being provided between the outer cylinder and the inner cylinder; and a substantially hollow cylindrical shaped packing provided outside a bottom surface of the plate. The filter element is provided inside a filter case. When the filter element is provided inside the filter case, a surface opposite to a surface of the packing abutted against the plate is abutted against a surface of the filter case which is in parallel with the plate. An inner circumference of the packing is abutted against a surface of the filter case which is inside of the inner cylinder and in parallel with the inner cylinder.

According to the above aspect of the present invention, the substantially hollow cylindrical shaped packing provided on the substantially cylindrical shaped plate having a bottom portion is abutted against the surface of the filter case in parallel with the plate and is abutted against the surface of the filter case which is inside of the inner cylinder and in parallel with the inner cylinder. The substantially cylindrical shaped plate having a bottom portion is provided in a manner of covering the end of the outer cylinder and the inner cylinder with the filtering material being provided between the outer cylinder and the inner cylinders. Therefore, it is possible to achieve a better leak-proof effect, e.g., sufficient leak-proofing even with a single packing.

Due to the above features, a hole may be formed in the bottom surface of the plate, and an insertion portion to be inserted into the hole is formed on the surface of the packing abutted against the plate. Therefore, the packing and the plate are integrally formed, so that the assembling of the filter element becomes easier.

Further, a protruding portion protruding circumferentially inwardly may be formed on an inner circumference of the packing, and the surface of the filter case which is inside of the inner cylinder and in parallel with the inner cylinder is abutted against the protruding portion. Thus, it is possible to increase the force applied against the surface in parallel with the inner cylinder by the packing, thereby improving the sealing effect.

Further, a plurality of protuberances may be formed on a surface opposite to the surface of the packing on which the insertion portion is formed. Therefore, it is possible to increase the force applied against the surface of the filter case in parallel with the plate by the packing, thereby improving the sealing effect.

Further, a protruding portion protruding circumferentially inwardly may be formed on an inner circumference of the packing, the surface of the filter case which is inside of the inner cylinder and in parallel with the inner cylinder is abutted against the protruding portion, and a plurality of protuberances are formed on a surface opposite to the surface of the packing on which the insertion portion is formed. Therefore, it is possible to increase the force applied against the surface in parallel with the inner cylinder by the packing and to increase the force applied against the surface of the filter case in parallel with the plate by the packing, thereby improving the sealing effect.

Further, the insertion portion may comprise a cylindrical portion having a substantially cylindrical shape, and a plurality of cutoffs radially penetrating through the cylindrical portion is formed on the cylindrical portion. Therefore, it is easy to insert the insertion portion when the insertion portion is inserted into the hole, thereby improving the assembly.

Furthermore, a groove surrounding the insertion portion may be formed on the surface of the packing on which the insertion portion is formed. Therefore, even if an adhesive (a liquid) coated to the inner side of the bottom surface of the plate leaks, since the adhesive flows into the groove, it is possible to prevent the adhesive from leaking out.

According to another aspect of the present invention, a filtering device includes a filter element and a filter case. The filter element includes: a substantially hollow cylindrical shaped outer cylinder having openings at both ends thereof; a substantially hollow cylindrical shaped inner cylinder provided inside the outer cylinder and having openings at both ends thereof; a substantially hollow cylindrical shaped filtering material provided between the outer cylinder and the inner cylinder; a substantially cylindrical shaped plate having a bottom portion provided in a manner of covering an end of the outer cylinder and the inner cylinder with the filtering material being provided between the outer cylinder and the inner cylinder; and a substantially hollow cylindrical shaped packing provided outside a bottom surface of the plate. The filter element is provided inside a filter case. When the filter element is provided inside the filter case, a surface opposite to a surface of the packing abutted against the plate is abutted against a surface of the filter case which is in parallel with the plate. An inner circumference of the packing is abutted against a surface of the filter case which is inside of the inner cylinder and in parallel with the inner cylinder.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE IVENTION

Figure 1:
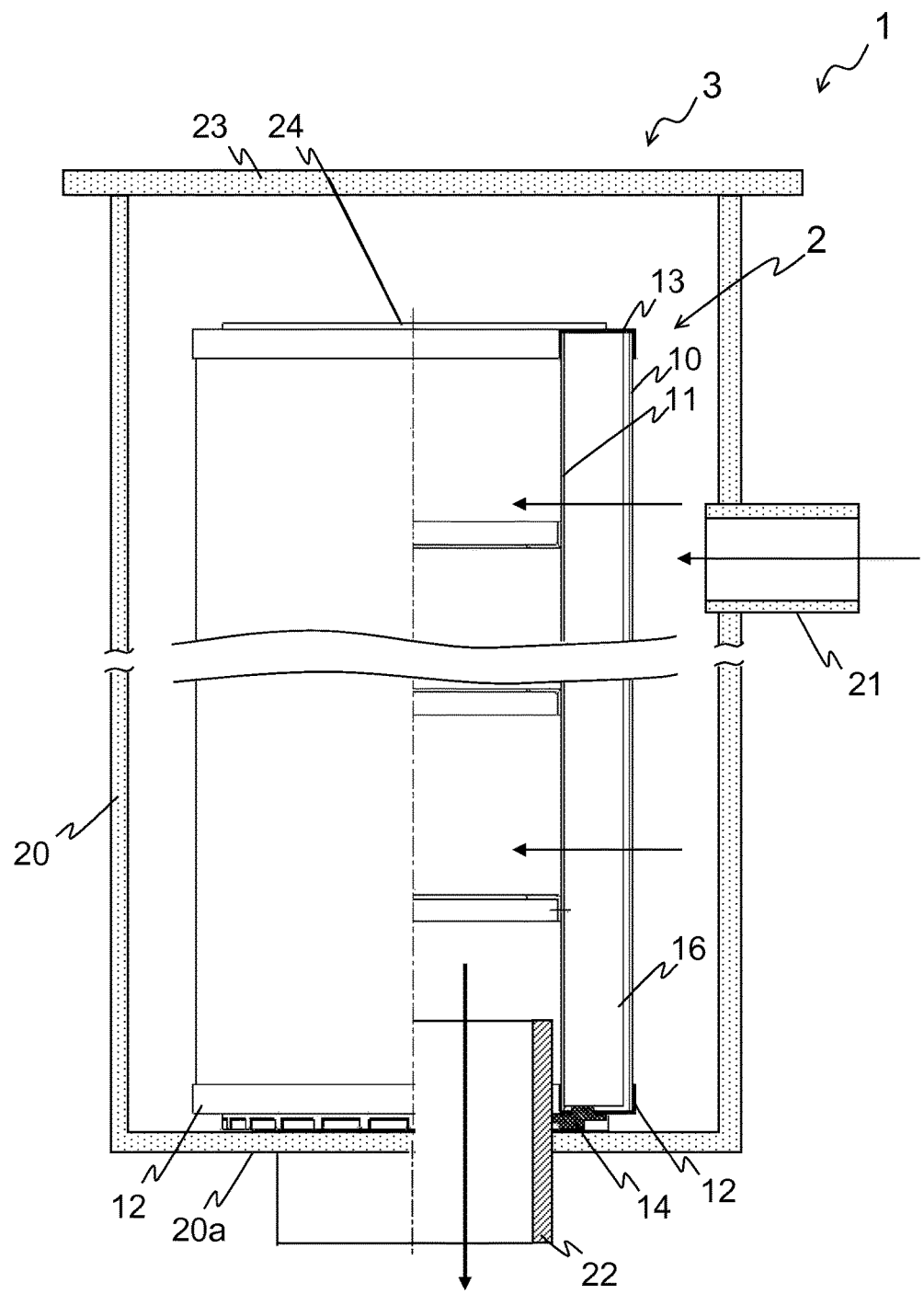
FIG. 1 is a schematic diagram showing a filtering device 1 according to an example of the present invention.

Embodiments of the present invention will be described below in detail with reference to the accompanying drawings. FIG. 1 is a schematic diagram of a filtering device 1 according to an example of the present invention. The filtering device 1 uses a filter to remove dusts contained in a liquid, such as oil, water and the like, and mainly includes a filter element 2 and a filter case 3. FIG. 1 shows a right part of the filter case 3 and the filter element 2 in cross section.

The filter element 2 mainly includes an outer cylinder 10, an inner cylinder 11, plates 12, 13 provided respectively at either end of the outer cylinder 10 and the inner cylinder 11, a packing 14, and a filtering material 16.

Each of the outer cylinder 10 and the inner cylinder 11 has a substantially hollow cylindrical shape having openings at both ends thereof. Both the outer cylinder 10 and the inner cylinder 11 are made of a material having a high corrosion resistance, such as stainless steel. A plurality of holes (not shown) are formed substantially throughout the outer cylinder 10 and the inner cylinder 11.

The inner cylinder 11 is provided inside the outer cylinder 10. The filtering material 16 is provided between the outer cylinder 10 and the inner cylinder 11. The filtering material 16 has a substantially hollow cylindrical shape and has a certain thickness in a radial direction thereof. The filtering material 16 is well-known in this art and thus a description thereof is omitted herein.

The plate 12 is provided at one end of the outer cylinder 10 and the inner cylinder 11, and the plate 13 is provided at the other end of the outer cylinder 10 and the inner cylinder 11. The plate 12 and the plate 13 each has a substantially cylindrical shape having a bottom portion and is made of a material having a high corrosion resistance, such as stainless steel. Both the plate 12 and the plate 13 are provided to cover the ends (opens) of the outer cylinder 10 and the inner cylinder 11, and the filtering material 16 is provided between the outer cylinder 10 and the inner cylinder 11. In other words, the outer cylinder 10, the inner cylinder 11 and the filtering material 16 are provided inside the plate 12, and the outer cylinder 10, the inner cylinder 11 and the filtering material 16 are provided inside the plate 13.

A packing 14 is provided on the plate 12, and a packing (not shown) is provided on the plate 13. The plate 12 mainly includes side surfaces 12a-1, 12a-2 and a bottom surface 12b (referring to FIG. 2), which will be described later.

The packing 14 is provided outside of the bottom surface 12b of the plate 12. The packing 14 is a substantially hollow annular plate shaped member. The packing 14 is a sealing member for preventing a fluid from leaking out. The packing 14 may be made of an elastic material, for example, a synthetic rubber such as nitrile-butadiene rubber (NBR), fluororubber (FKM), a resin and the like. The detailed description of the packing 14 will be set forth later.

The outer cylinder 10, the inner cylinder 11, the plates 12 and 13, the packing 14 and the filtering material 16 are formed integrally as the filter element 2. The filter element 2 is provided inside the filter case 3.

The filter case 3 has a case 20, a case inflow portion 21, a case outflow portion 22, and covers 23 and 24.

The case inflow portion 21 is provided on a side surface of the case 20. In addition, the case outflow portion 22 having a surface parallel to the outer cylinder 10 or the inner cylinder 11 is provided on a surface of the case 20 in parallel with the plate 12 (here, the bottom portion 20a). Further, the cover 23 is provided on an upper portion of the case 20 in a manner of covering the opening, with the unshown packing located therebetween.

The cover 24 is provided at one end of the outer cylinder 10. A spring (not shown) is provided between the cover 23 and the cover 24. The spring applies a force on the cover 24 and thus on the filter element 2 in a downward direction of FIG. 1 (a direction from the cover 23 towards the bottom portion 20a). Therefore, the filter element 2 is held in a position within the filter case 3.

A liquid flow is denoted by an arrow in FIG. 1. The liquid to be filtered flows from the case inflow portion 21 into the case 20. The liquid flowing into the interior of the case 20 flows through the holes formed in the outer cylinder 10, the filtering material 16 and the holes formed in the inner cylinder 11 and flows into the inner cylinder 11. The liquid flowing into the inner cylinder 11 flows out from the case outflow portion 22.

The case 20, the case inflow portion 22 and the filter element 2 are sealed by the packing 14. Therefore, the liquid filtered by the filtering material 16 will flow out from the case outflow portion 22 without leaking out from the filter case 3.

Figure 2:
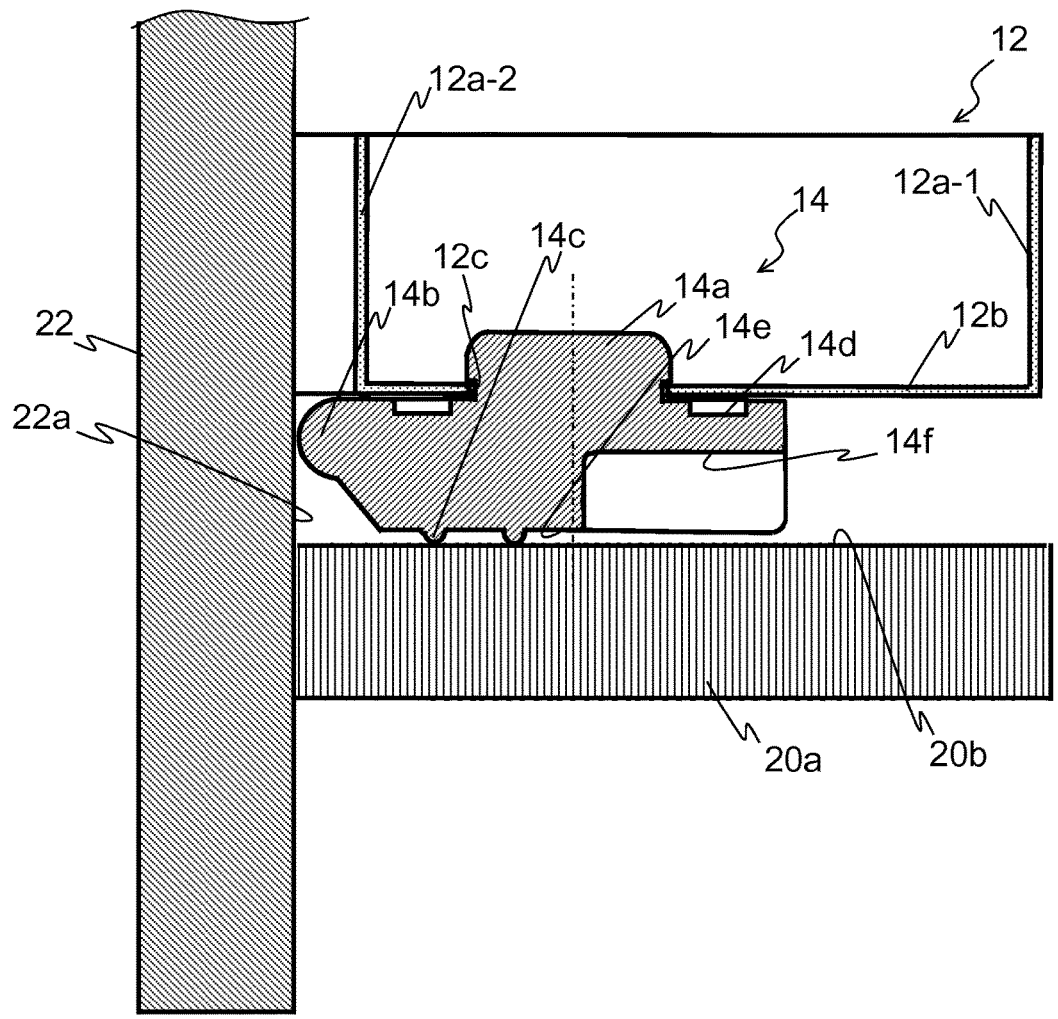
FIG. 2 is a partial enlarged view of a sealing portion.

A sealing configuration will be described in detail below. FIG. 2 is a partial enlarged view of a sealing portion. The packing 14 mainly has an insertion portion 14a, a protruding portion 14b, a protuberance 14c and a groove 14d formed thereon.

The insertion portion 14a is formed to have a substantially cylindrical shape which protrudes from an end surface. The insertion portion 14a is inserted into a hole 12c formed on the bottom surface 12b. A diameter of a part of the insertion portion 14a fitting with the hole 12c is smaller than that of other parts thereof.

The protruding portion 14b is formed on an inner circumferential surface of the packing 14 in a manner of protruding radially inwardly. The protruding portion 14b is abutted and pressed against an outer circumferential surface 22a of the case outflow portion 22, to ensure the sealing of the outer circumferential surface 22a of the case outflow portion 22.

In the present embodiment, the protruding portion 14b is a substantially hemisphere shape, however, the protruding portion 14b is not limited thereto as long as the protruding portion 14b is in a line contact with the outer circumferential surface 22a of the case outflow portion 22. For example, a cross-section of the protruding portion 14b may be a substantially triangular shape. In addition, the protruding portion 14b may also be a substantially rectangular shape, so that an entire surface of the protruding portion 14b is abutted against the outer circumferential surface 22a of the case outflow portion 22. However, in order to improve sealing effect, it is desirable to have a line contact between the protruding portion 14b and the outer circumferential surface 22a of the case outflow portion 22.

The protuberance 14c is provided on an end surface opposite to the end surface on which the insertion portion 14a is formed. The protuberance 14c is abutted and pressed against an inner surface 20b of the bottom portion 20a, to ensure the sealing of the inner surface 20b of the bottom portion 20a. In the present embodiment, a cross-section of the protuberance 14c is a substantially semicircular shape. In addition, in the present embodiment, the protuberance 14c is two circles having different diameters when viewing the overall end surface on which the protuberance 14c is provided.

It should be noted that the shape of the protuberance 14c is not limited herein as long as the protuberance 14c is in a line contact with the inner surface 20b. For example, the cross-section of the protuberance 14c may also be substantially triangular. In addition, the protuberance 14c may be not necessary. It is also possible to ensure the sealing of the case 20 by contacting the whole bottom surface 14e of the packing 14 with the inner surface 20b. However, in order to improve sealing effect, it is desirable to provide the protuberance 14c.

The groove 14d is formed to surround the insertion portion 14a. In the present embodiment, a cross-section of the groove 14d is a substantially rectangular shape, and the shape of the groove 14d is not limited thereto. In addition, the groove 14d may be not necessary.

It should be noted that the shape of the packing 14 is not limited herein. For example, in the present embodiment, a cutout 14f is formed on a lower side of the packing 14. However, the cutout 14f may be not necessary.

Next, a method for manufacturing the filtering device 1 will be described.

When inserting the insertion portion 14a into the hole 12c formed on the bottom surface 12b of the plate 12, the packing 14 is mounted on the plate 12. Since the diameter of the part of the insertion portion 14a fitting with the hole 12c is smaller than that of other parts of the insertion portion 14a, a larger-diameter part of the insertion portion 14a covers the hole 12c when the insertion portion 14a is inserted into the hole 12c. Therefore, it is possible to prevent the packing 14 from being disengaged from the plate 12.

After mounting the packing 14 on the plate 12, an adhesive (not shown) is coated to an inner side of the bottom surface 12b (an upper side of the bottom surface 12b in FIG. 2). Then, the plate 12 and the packing 14 coated with the adhesive are mounted on the end surfaces of the outer cylinder 10 and the inner cylinder 11 between which the filtering material 16 is inserted. In addition, the plate 13 on which the adhesive is coated is mounted on the end surfaces of the outer cylinder 10 and the inner cylinder 11 between which the filtering material 16 is inserted. As a result, the filtering material 16 is provided between the outer cylinder 10 and the inner cylinder 11. It should be noted that the adhesive is in a liquid state when being coated, and then is in a solid state after being cured. However, the adhesive is in the liquid state during assembling the filtering device 1.

At this time, the filtering material 16 is abutted against a front end of the insertion portion 14a. Since the packing 14 has elasticity, even if there is an error in a length of the filter material 16, the error can be absorbed by reducing a height of the insertion portion 14a.

A part of the adhesive coated on the inner side of the bottom surface of the plate 12 may flow to the outside of the plate 12 from the hole 12c. However, since the groove 14d is formed surrounding the insertion portion 14a, the adhesive flowing to the outside of the plate 12 will flow into the groove 14d. Therefore, it is possible to prevent the adhesive from flowing out between the plate 12 and the packing 14 so that the adhesive will be prevented from being adhered to an exterior.

The thus-assembled filter element 2 is mounted inside the filter case 3. When the filter element 2 is inserted into the case 20, the outer circumferential surface 22a of the case outflow portion 22 is abutted against the protruding portion 14b, and the inner surface 20b of the bottom portion 20a is abutted against the protuberance 14c.

Then, a spring (not shown) is provided between the cover 23 and the cover 24, and the cover 23 is mounted onto the case 20. Thus, it is possible to prevent the liquid from flowing out between the filter element 2 and the cover 24 by pressing the cover 24 against a packing (not shown) provided on the plate 13 via the spring (not shown).

In addition, since the filter element 2 is pressed towards the bottom portion 20a by the spring (not shown), the protuberance 14c is deformed in a direction in which a height thereof becomes smaller. Therefore, it is possible to prevent the liquid from leaking out between the plate 12 (the packing 14) and the bottom portion 20a.

Further, the protruding portion 14b is deformed outward in a radial direction of the packing 14 by abutting the outer circumferential surface 22a against the protruding portion 14b, thereby preventing the liquid from leaking out between the plate 12 (the packing 14) and the case outflow portion 22. It should be noted that, when the filter element 12 is inserted into the case 20, since the outer circumferential surface 22a is abutted against the protruding portion 14b and inserted thereto, it is desirable that the protruding portion 14b has a substantially hemispherical shape.

According to the present embodiment, when the filter element 2 is mounted inside the filter case 3, the packing 14 contacts the filter case 3 (herein, the case 20 and the case outflow portion 22) at several positions, and the packing 14 is deformed in several directions. Thus, it is possible to obtain a higher leak proof effect by using one packing 14. In addition, it is possible to improve sealing effect by abutting the protruding portion 14b of the packing 14 against the outer circumferential surface 22a of the outflow portion 22 such that the amount of deformation of the protruding portion 14b is increased, that is, the force pressed against the outer circumferential surface 22a of the case outflow portion 22 by the packing 14 can be increased. Further, it is possible to improve sealing effect by abutting the bottom portion 20a of the case 20 against the protuberance 14c to increase the force pressed by the packing 14 against the bottom portion 20a of the case 20.

In addition, according to the present embodiment, since a part of the packing 14 is inserted into the hole 12c formed on the plate 12, the assembly becomes easier. Further, since the inner side of the bottom surface 12 of the plate 12 is coated with the adhesive, it is possible to bond the plate 12 and the filter material 16 as well as to bond packing 14 and the plate 12.

It should be noted, in the present embodiment, the packing 14 is provided outside the bottom surface of the plate 12 by inserting the insertion portion 14a of the packing 14 into the hole 12c formed on the plate 12. However, an arrangement of the packing 14 on the bottom surface 12b of the plate 12 is not limited herein. For example, it is possible to bond the outer side of bottom surface 12b of the plate 12 with the end surface of the packing 14 without forming the insertion portion 14a.

Figure 3:
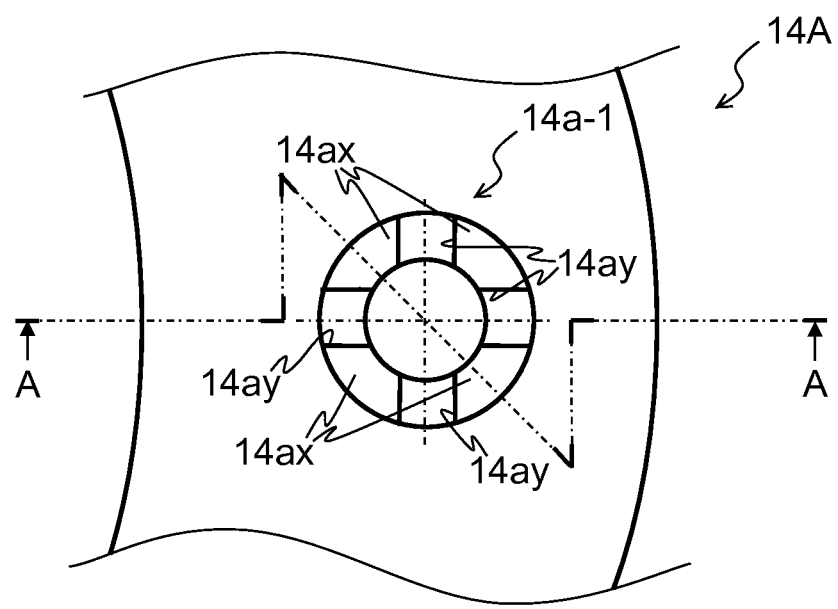
FIG. 3 is a partial enlarged view of a modification of a packing.
Figure 4:
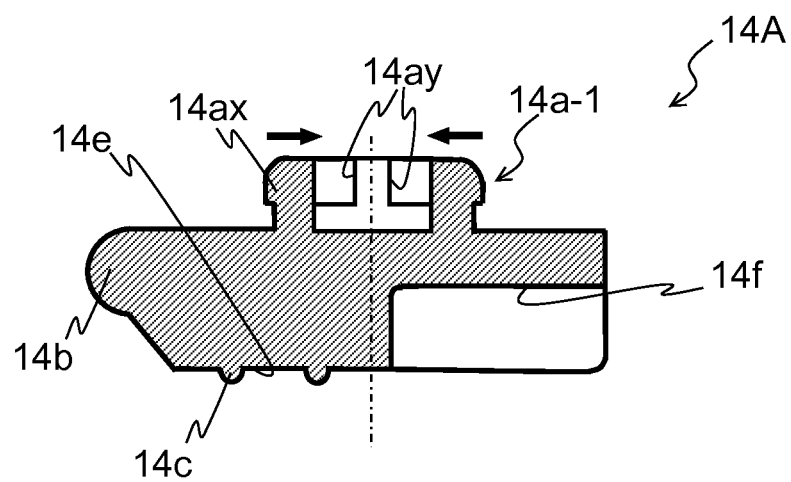
FIG. 4 is a cross-section view taken along a line A-A shown in FIG. 3.

Further, in the present embodiment, the insertion portion 14a has a substantially cylindrical shape, however, the shape of the insertion portion 14a is not limited thereto. FIGS. 3 and 4 are views showing details of a packing 14A having an insertion portion 14a-1. FIG. 3 is a partial enlarge view, and FIG. 4 is a cross-section view taken along a line A-A in FIG. 3. The only difference between the packing 14 and the packing 14A is the shape of the insertion portion 14a-1 and thus the description to other parts of the packing 14A in detail is omitted herein.

The insertion portion 14a-1 is inserted into the hole 12c formed on the bottom surface 12b. Like the insertion portion 14a, a diameter (an outer circumference) of a part of the insertion portion 14a-1 fitting with hole 12c is smaller than that of other parts of the insertion portion 14a-1.

The insertion portion 14a-1 includes a cylindrical portion 14ax having a substantially cylindrical shape and formed in a manner of protruding from the end surface. In addition, a plurality of cutouts 14ay radially penetrating therethrough the cylindrical portion 14ax is formed on the cylindrical portion 14ax. In the present embodiment, the cutouts 14ay are located at four positions in a manner of substantially cross shape (a criss-crossing shape), the position and number of the cutouts 14ay, however, are not limited thereto.

The insertion portion 14a-1 can be deformed radially inwardly (see the arrow in FIG. 4) by forming the plurality of cutoffs 14ay in the cylindrical portion 14ax. As a result, it is easy to insert the insertion portion 14a-1 when inserting the insertion portion 14a-1 into the hole 12c, thereby improving the assembly.

Although embodiments of the present invention have been described in detail with reference to the accompanying drawings, the specific configuration is not limited thereto. Rather, many modifications are possible without departing from the spirit and scope of the present invention. In addition, the terms "substantially" and "approximately" not only cover strictly identical situations, but also cover errors or modifications which do not loss equivalence.

What is claimed is:

1. A filter element comprising:
   a substantially hollow cylindrical shaped outer cylinder including openings at both ends thereof;
   a substantially hollow cylindrical shaped inner cylinder disposed inside the outer cylinder and including openings at both ends thereof;
   a substantially hollow cylindrical shaped filtering material disposed between the outer cylinder and the inner cylinder;
   a substantially cylindrical shaped plate including a bottom portion disposed in a manner of covering an end of the outer cylinder and the inner cylinder with the filtering material provided between the outer cylinder and the inner cylinder; and
   a substantially hollow cylindrical shaped packing disposed outside a bottom surface of the plate,
   wherein the filter element is disposed inside a filter case;
   wherein when the filter element is disposed inside the filter case, a surface opposite to a surface of the packing abutted against the plate is abutted against a surface of the filter case which is in parallel with the plate, and an inner circumference of the packing is abutted against a surface of the filter case which is inside of the inner cylinder and in parallel with the inner cylinder;
   wherein a hole is formed in the bottom surface of the plate, and an insertion portion to be inserted into the hole is formed on the surface of the packing abutted against the plate;
   wherein a protruding portion which protrudes radially inwardly is formed on an inner circumference of the packing, and the surface of the filter case which is inside of the inner cylinder and in parallel with the inner cylinder is abutted against the protruding portion;
   wherein a plurality of protuberances are formed on a surface opposite to the surface of the packing on which the insertion portion is formed;
   wherein the packing is made of an elastic material; and
   wherein the packing includes intersections between a straight line including a tip of the protruding portion and being parallel to the surface on which the plurality of protuberances are formed, and other straight lines including tips of the plurality of protuberances and being parallel to an inserting direction of the insertion portion.

2. The filter element according to claim 1, wherein the insertion portion comprises a cylindrical portion having a substantially cylindrical shape; and
   a plurality of cutoffs radially penetrating through the cylindrical portion is formed on the cylindrical portion.

3. The filter element according to claim 1, wherein a groove surrounding the insertion portion is formed on the surface of the packing on which the insertion portion is formed.

4. A filtering device comprising a filter element and a filter case, wherein the filter element includes:
   a substantially hollow cylindrical shaped outer cylinder having openings at both ends thereof;
   a substantially hollow cylindrical shaped inner cylinder provided inside the outer cylinder and having openings at both ends thereof;
   a substantially hollow cylindrical shaped filtering material provided between the outer cylinder and the inner cylinder;
   a substantially cylindrical shaped plate having a bottom portion and provided in a manner of covering an end of the outer cylinder and the inner cylinder with the filtering material being provided between the outer cylinder and the inner cylinder; and
   a substantially hollow cylindrical shaped packing provided outside a bottom surface of the plate,
   wherein the filter element is configured inside a filter case; and
   wherein when the filter element is configured inside the filter case, a surface opposite to a surface of the packing abutted against the plate is abutted against a surface of the filter case which is in parallel with the plate, and an inner circumference of the packing is abutted against a surface of the filter case which is inside of the inner cylinder and in parallel with the inner cylinder;
   wherein a hole is formed in the bottom surface of the plate, and an insertion portion to be inserted into the hole is formed on the surface of the packing abutted against the wherein a protruding portion which protrudes radially inwardly is formed on an inner circumference of the packing, and the surface of the filter case which is inside of the inner cylinder and in parallel with the inner cylinder is abutted against the protruding portion;
   wherein a plurality of protuberances are formed on a surface opposite to the surface of the packing on which the insertion portion is formed;
   wherein the packing is made of an elastic material; and
   wherein the packing includes intersections between a straight line including a tip of the protruding portion and being parallel to the surface on which the plurality of protuberances are formed, and other straight lines including tips of the plurality of protuberances and being parallel to an inserting direction of the insertion portion.

5. The filter device according to claim 4, wherein
the insertion portion comprises a cylindrical portion having a substantially cylindrical shape; and
a plurality of cutoffs radially penetrating through the cylindrical portion is formed on the cylindrical portion.

6. The filter device according to claim 4, wherein
a groove surrounding the insertion portion is formed on the surface of the packing on which the insertion portion is formed.

7. The filter element according to claim 1, further comprising:
an adhesive coated on at least a part of the bottom portion of the substantially cylindrical shaped plate, the part abutting against the packing.

8. The filtering device according to claim 4, further comprising:
an adhesive coated on at least a part of the bottom portion of the substantially cylindrical shaped plate, the part abutting against the packing.

9. The filtering element according to claim 3, further comprising:
an adhesive coated on at least a part of the bottom portion of the substantially cylindrical shaped plate, the part abutting against the packing.

10. The filtering device according to claim 6, further comprising:
an adhesive coated on at least a part of the bottom portion of the substantially cylindrical shaped plate, the part abutting against the packing.

* * * * *